(12) United States Patent
Hanna et al.

(10) Patent No.: US 10,174,555 B2
(45) Date of Patent: Jan. 8, 2019

(54) DRILLING RIG AND DRILL HEAD OF A DRILLING RIG

(71) Applicant: EPIROC ROCK DRILLS AKTIEBOLAG, Örebro (SE)

(72) Inventors: Jan Hanna, Hässelby (SE); Martin Forsberg, Osby (SE); Jim Gryler, Energyda (SE)

(73) Assignee: EPIROC ROCK DRILLS AKTIEBOLAG, Örebro (SE)

( * ) Notice: Subject to any disclaimer, the term of this patent is extended or adjusted under 35 U.S.C. 154(b) by 207 days.

(21) Appl. No.: 15/306,334

(22) PCT Filed: Apr. 17, 2015

(86) PCT No.: PCT/SE2015/050446
§ 371 (c)(1),
(2) Date: Oct. 24, 2016

(87) PCT Pub. No.: WO2015/163809
PCT Pub. Date: Oct. 29, 2015

(65) Prior Publication Data
US 2017/0044832 A1 Feb. 16, 2017

(30) Foreign Application Priority Data
Apr. 24, 2014 (SE) ..................................... 1450485

(51) Int. Cl.
*E21B 3/02* (2006.01)
*E21B 7/02* (2006.01)
(Continued)

(52) U.S. Cl.
CPC ................ *E21B 3/02* (2013.01); *E21B 7/025* (2013.01); *F16D 11/14* (2013.01); *F16D 25/08* (2013.01);
(Continued)

(58) Field of Classification Search
CPC ...................................... E21B 3/00; E21B 3/02
(Continued)

(56) References Cited

U.S. PATENT DOCUMENTS 1,825,087 A * 9/1931 Park .......................... E21B 3/02
254/348
2,049,127 A 7/1936 Maybach
(Continued)

FOREIGN PATENT DOCUMENTS

CL 200200079 10/2002
CL 49164 3/2013
(Continued)

OTHER PUBLICATIONS

PCT/ISA/210—International Search Report—dated Aug. 17, 2015 (Issued in Application No. PCT/SE2015/050446).
(Continued)

*Primary Examiner* — Kenneth L Thompson
(74) *Attorney, Agent, or Firm* — Venable LLP; Jeffri A. Kaminski

(57) ABSTRACT

A drill head for a rotation drilling rig, including: a rotation motor, a drill head spindle, and a gear change transmission between the rotation motor and the drill head spindle, the gear change transmission including an input shaft connected to the rotation motor and an output shaft connected to the drill head spindle. The input shaft is co-axial with the output shaft, the input shaft is permanently coupled to an intermediate shaft over a first speed reduction gear couple, the gear change transmission) includes a clutch being shiftable between a first position interconnecting the input and output shafts for obtaining the same rotational speed for the input and output shafts, and a second position connecting the intermediate shaft to the output shaft over a second speed reduction gear couple. The invention also relates to a rig.

13 Claims, 7 Drawing Sheets

(51) Int. Cl.
*F16D 11/14* (2006.01)
*F16D 25/08* (2006.01)
*F16H 3/02* (2006.01)
*F16H 57/04* (2010.01)
*F16H 63/32* (2006.01)
*F16D 11/00* (2006.01)
*F16H 63/30* (2006.01)

(52) U.S. Cl.
CPC ........... *F16H 3/02* (2013.01); *F16H 57/0436* (2013.01); *F16H 63/32* (2013.01); *E21B 7/02* (2013.01); *F16D 2011/008* (2013.01); *F16H 2063/3093* (2013.01)

(58) Field of Classification Search
USPC .................................. 166/237; 175/162, 170
See application file for complete search history.

(56) References Cited

U.S. PATENT DOCUMENTS

| | | | | |
|---|---|---|---|---|
| 2,071,778 | A * | 2/1937 | Walne | E21B 3/02 417/429 |
| 2,451,598 | A | 10/1948 | Wilson | |
| 4,298,076 | A | 11/1981 | Winsor et al. | |
| 4,423,645 | A * | 1/1984 | Abbott | E21B 3/02 173/216 |
| 5,510,908 | A | 4/1996 | Watanabe et al. | |
| 7,093,679 | B1 * | 8/2006 | Watson | E21B 7/021 173/176 |
| 7,770,668 | B2 | 8/2010 | Kruse et al. | |
| 2009/0166090 | A1 * | 7/2009 | Rudshaug | E21B 3/02 175/85 |

FOREIGN PATENT DOCUMENTS

| | | |
|---|---|---|
| CN | 101105112 A | 1/2008 |
| CN | 201176848 Y | 1/2009 |
| CN | 201339437 Y | 11/2009 |
| CN | 201753583 U | 3/2011 |
| CN | 102213075 A | 10/2011 |
| CN | 102536111 A | 7/2012 |
| DE | 883679 C | 7/1953 |
| EP | 0 009 629 A1 | 4/1980 |
| EP | 0009639 A2 | 4/1980 |
| EP | 0994234 A2 | 4/2000 |
| GB | 395293 A | 7/1933 |
| WO | 2013106207 A1 | 7/2013 |

OTHER PUBLICATIONS

PCT/ISA/237—Written Opinion of the International Searching Authority—dated Aug. 17, 2015 (Issued in Application No. PCT/SE2015/050446).

Chilean Office Action dated Oct. 16, 2018 in corresponding Chilean Patent Application No. 201602701 (10 pages).

* cited by examiner

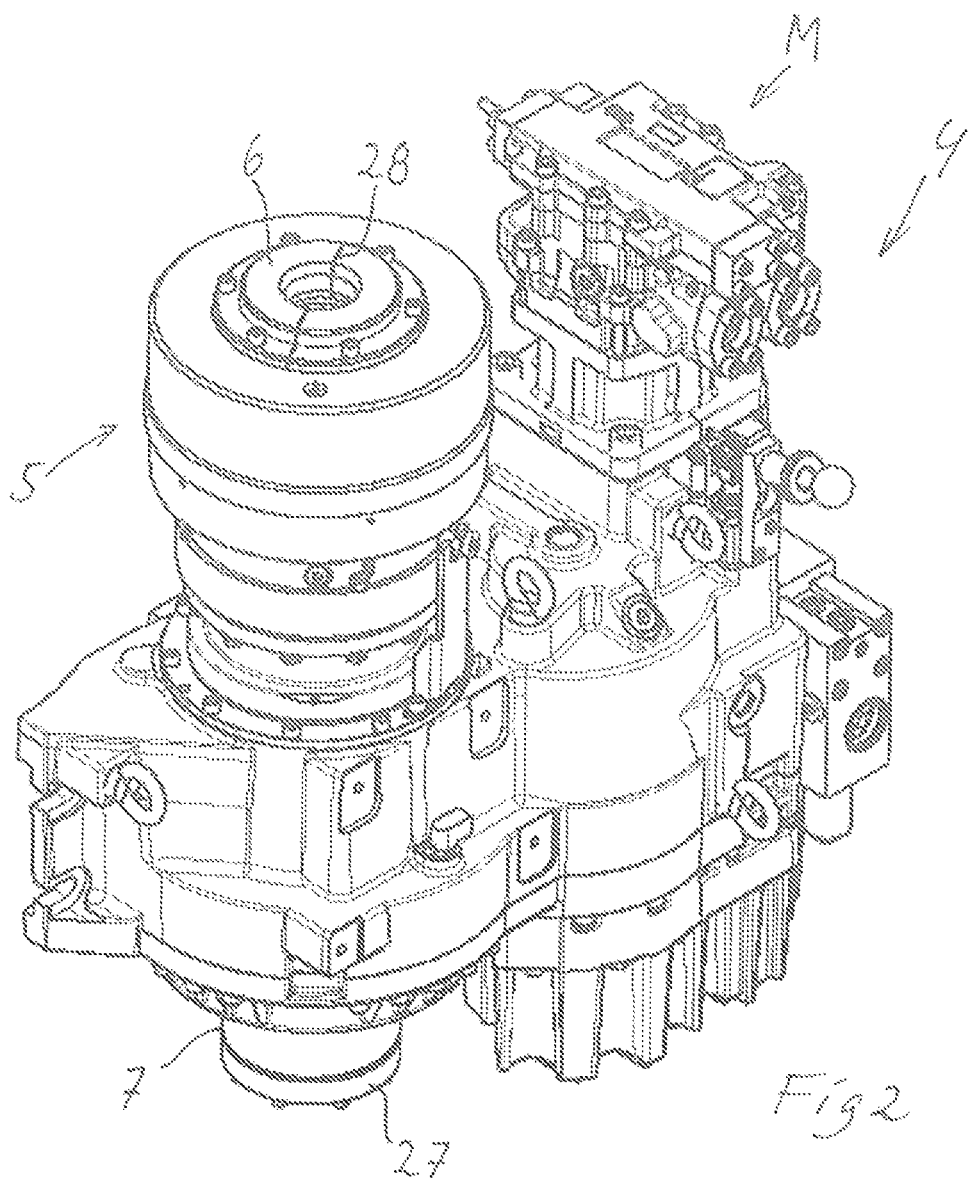

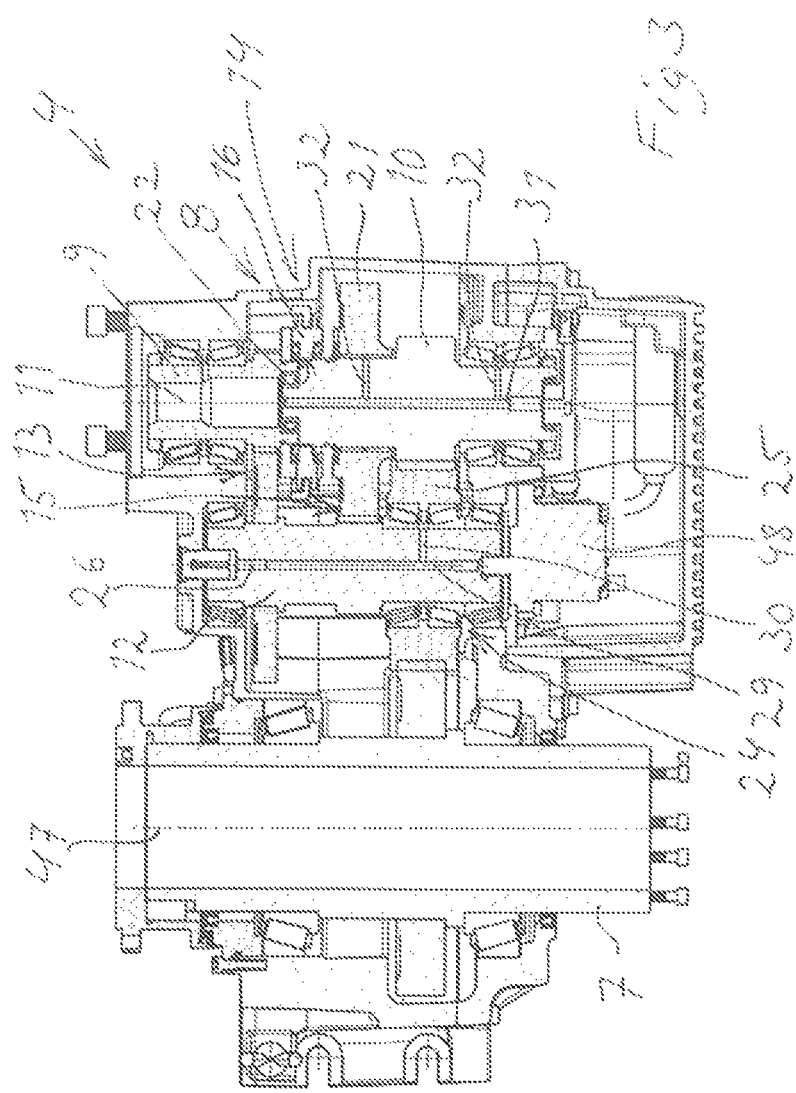

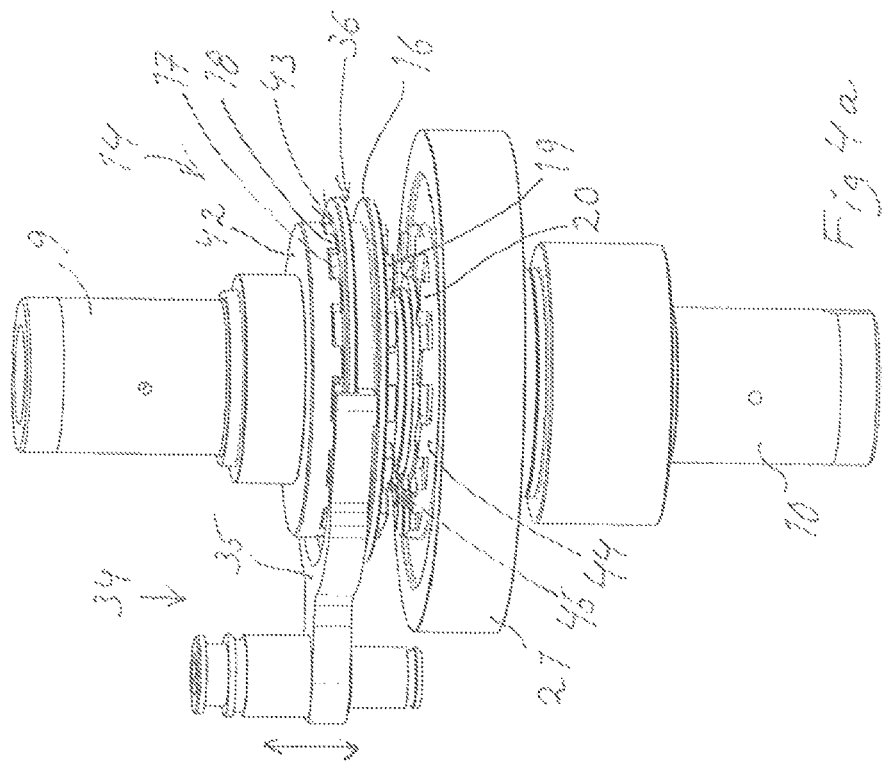
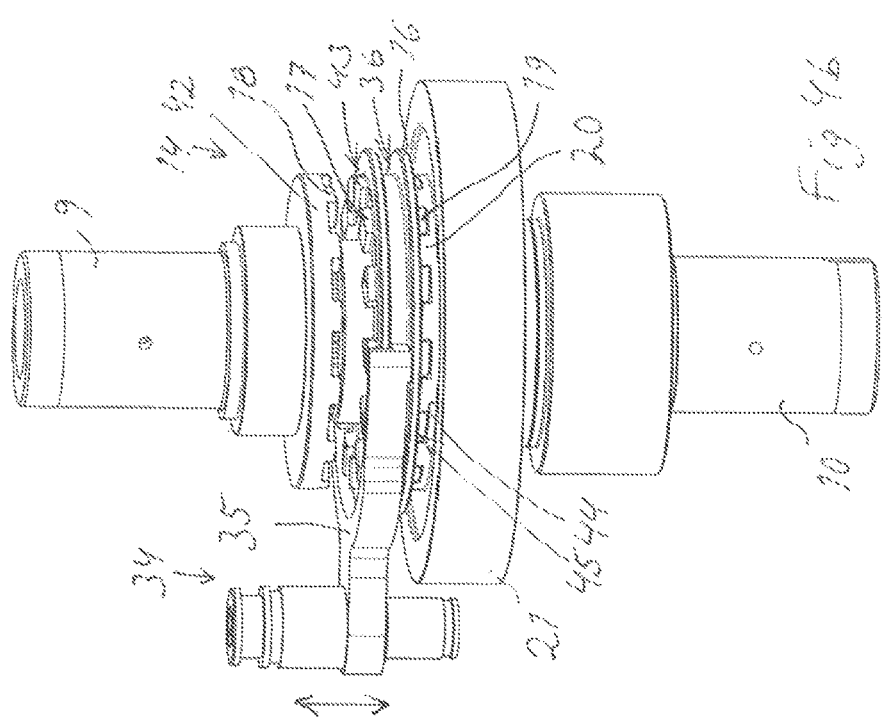

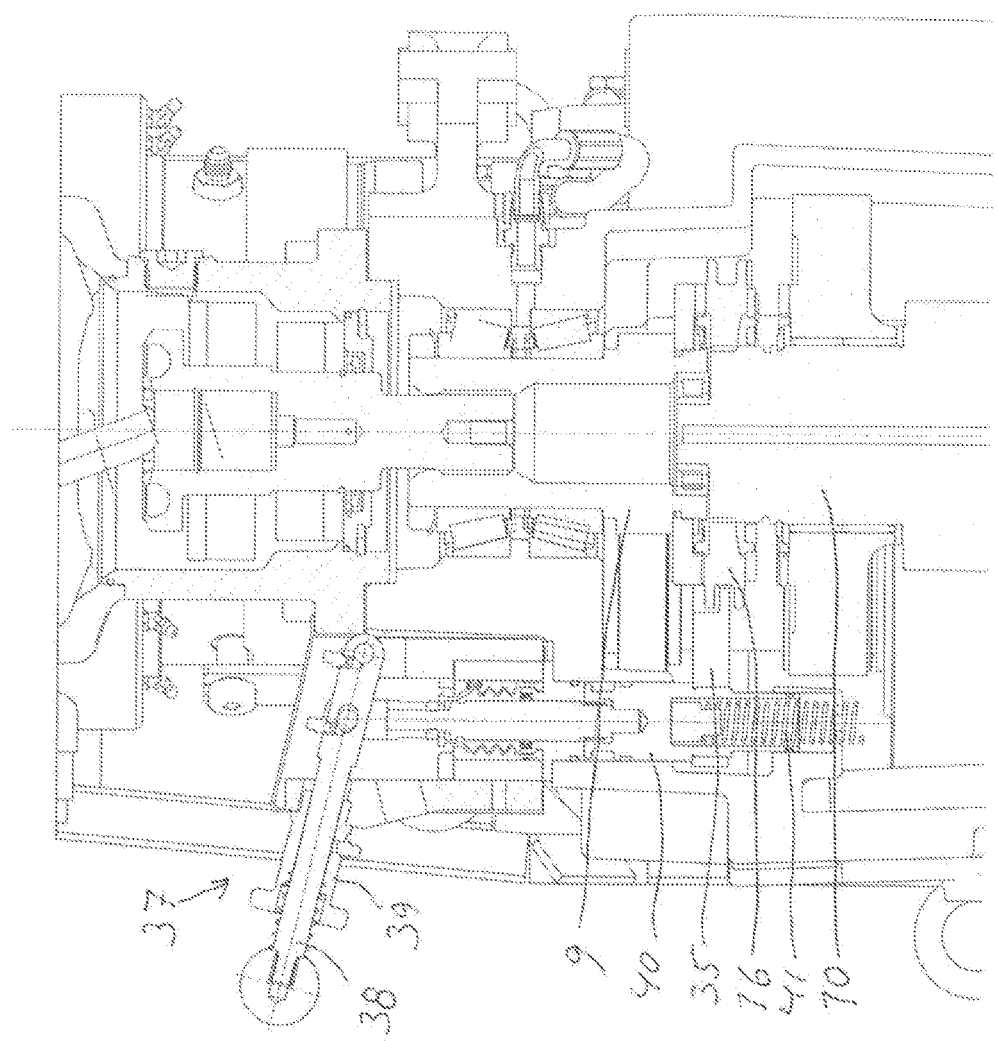

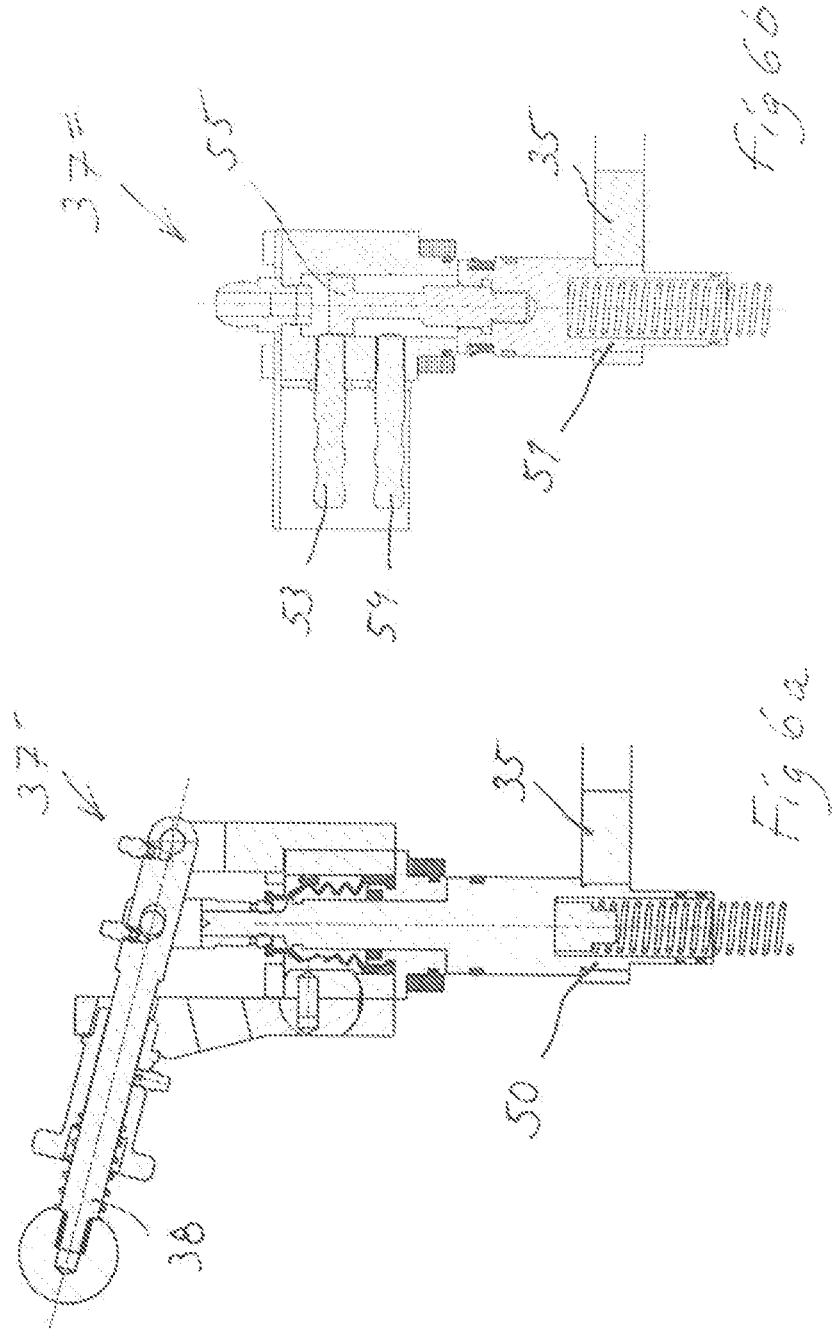

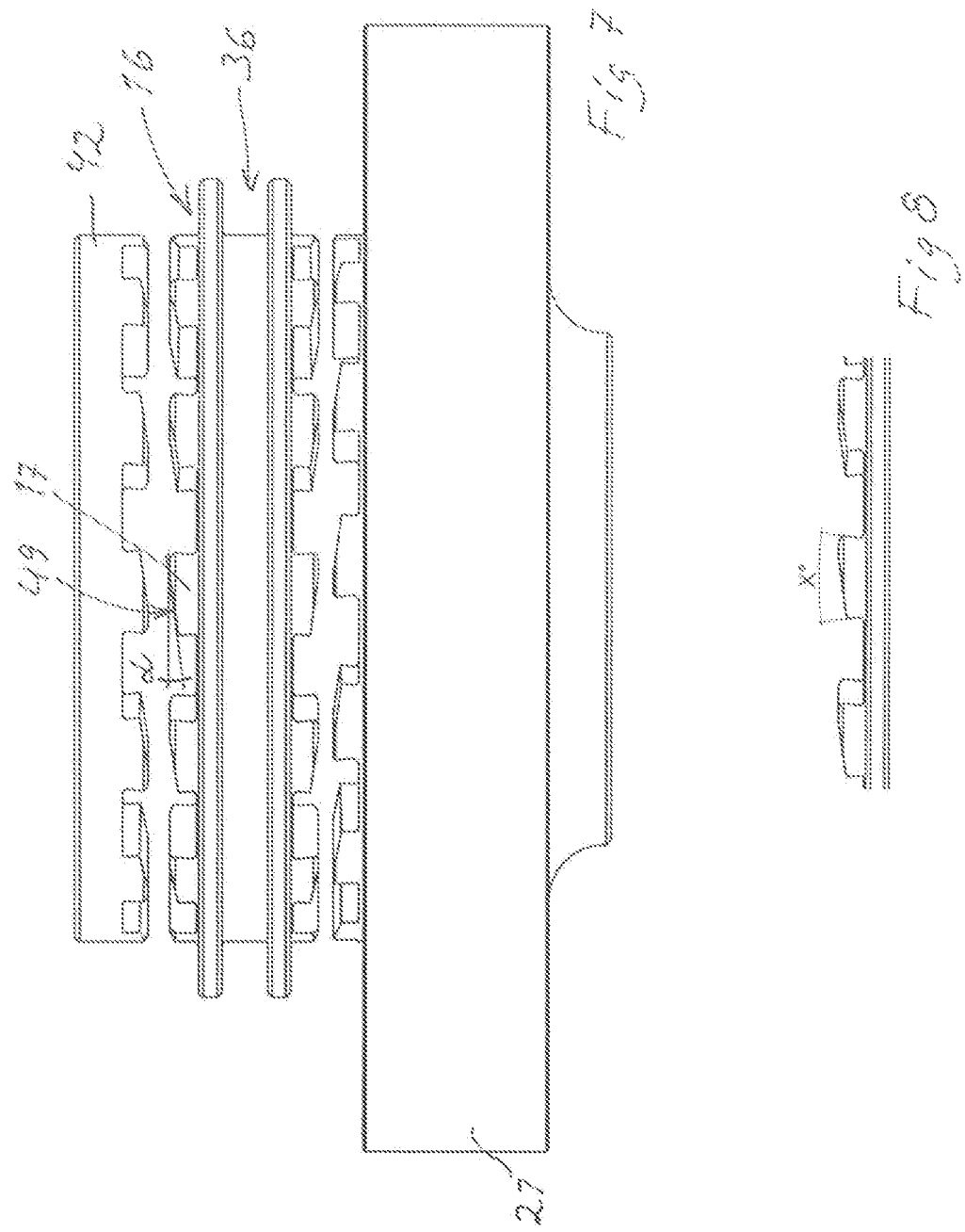

DRILLING RIG AND DRILL HEAD OF A DRILLING RIG

CROSS-REFERENCE TO RELATED APPLICATIONS

The application claims priority to Swedish patent application 1450485-6 filed 24 Apr. 2014 and is the national phase under 35 U.S.C. § 371 of PCT/SE2015/050446 filed 17 Apr. 2015.

FIELD OF THE INVENTION

The invention relates to a drill head for a rotation drilling rig, including: a rotation motor, a drill head spindle, and a gear change transmission between the rotation motor and the drill head spindle, the gear change transmission including an input shaft connected to the rotation motor and an output shaft connected to the drill head spindle. The invention also concerns a drilling rig.

BACKGROUND OF THE INVENTION

Drill heads for exploration drilling rigs are previously known that are equipped with hydraulically actuated chucks for gripping, holding and rotating drill pipes constituting the drill string components. The drill head is movable along a feed beam of the drilling rig while performing the rotating action during drilling.

In order to adapt the drilling mode to different drilling conditions it is previously known to provide drill heads with speed shift arrangements. One example of such a background art speed shift drill head is described in WO2013/106207.

AIM AND MOST IMPORTANT FEATURES OF THE INVENTION

It is an aim of the present invention to provide a further development of and an improvement over the background art and to at least reduce complexity problem associated with previous constructions while maintaining high operational reliability.

This aim is obtained with respect to a drill head as above in that the input shaft is co-axial with the output shaft, the input shaft is permanently coupled to an intermediate shaft over a first speed reduction gear couple, and the gear change transmission includes a clutch being shiftable between: a first position interconnecting the input and output shafts for obtaining the same rotational speed for the input and output shafts, and a second position connecting the intermediate shaft with the output shaft over a second speed reduction gear couple.

This makes it possible to construct a reliable, compact and uncomplicated drill head which allows reduced costs and increased flexibility of manufacture.

The rotation motor is advantageously directly connected to the input shaft and if it is controlled by being speed adjustable, a wide range of drill head spindle speeds can be obtained with the possibility of maximum torque for different speeds even though the drill head only provides for two different speeds.

A primary method of motor speed control is to vary the hydraulic motor displacement while maintaining a constant maximum hydraulic flow and pressure (max displacement results in max torque, min displacement means max speed). Maintaining max hydraulic flow and pressure lets the hydraulic motor and therefore the drill head produce maximum rotation power over a wide speed range.

Reducing the hydraulic flow to the motor for speed control is not desirable since it also reduces the motor power output.

It is preferred that the clutch is a twin dog clutch including an axially movable shifting sleeve having: first sleeve teeth for co-operation with input teeth associated with the input shaft in the first position, and second sleeve teeth for co-operation with output teeth on a driven gear wheel of the second speed reduction gear couple, said driven gear wheel being co-axial with the output shaft, in the second position. The teeth are directed in a axial directions such that axial displacement of the shifting sleeve results in coupling to either clutch members being associated with and fastened to the respective one of the input and output shafts.

A dog clutch is a type of clutch that couples two rotating shafts or other rotating components not by friction but by interference. The two parts of the clutch are designed such that one will push the other so as to reach an engagement position.

To engage, with a speed difference between the two connecting parts, a dog clutch requires an amount of backlash between the teeth. A large amount of backlash makes engagement possible at a higher differential speed. In a drill head application, it is desired to minimize amount of backlash to minimize or prevent torsional vibrations in the drive train. The amount of backlash required to do this, is smaller than the amount required for engaging the clutch at the intended differential rotational speed at shifting. Altogether, the provision of the twin dog clutch in the inventive drill head results in a rugged reliable and economic solution.

In the first position of the clutch, a driven gear wheel of the second speed reduction gear couple is free to rotate with respect to the output shaft and is supported on the output shaft (preferably over roller—needle bearings). In the second position of the clutch, however, the driven gear wheel of the second speed reduction gear couple is made rotationally fixed to the output shaft.

For that purpose, it is also preferred that the shifting sleeve is permanently rotationally coupled to the output shaft. This is suitably realized in that there are provided axially extending outside splines on the output shaft permanently engaged with corresponding inside splines on the shifting sleeve in different axial positions of the shifting sleeve.

It is preferred that the first and the second sleeve teeth and the input and output teeth have angled top lands allowing contact when coupling is initiated prior to completed interconnection in the respective first and second positions of the twin dog clutch.

This feature of the twin dog clutch means that the top lands (surfaces) of the dog clutch teeth are angled so that the engagement of the two parts can be done at higher differential speed and with a small amount of backlash in the clutch.

The tooth surface is thus preferably angled so that engagement is made easier. By making both clutch parts with similar or same angles on the tooth surfaces, the clutch parts can start to move axially before the teeth hits the spaces in the mating coupling part i.e. when the teeth mate in the engaging position.

Optionally, the dog clutch teeth can have back-taper so that the torque will at least contribute to pull the clutch parts towards each other into full axial contact as soon as they have started to engage.

The advantages of this aspect of the invention are:
a) Backlash can be kept to a minimum, thus reducing or preventing torsional vibrations.
b) Engagement is possible at higher differential speed as time for axial movement of the clutch part is increased.

The output shaft is advantageously permanently rotationally coupled to the drill head spindle. This is advantageously obtained when the output shaft is coupled to the drill head spindle over a gear train having an intermediate gear wheel being supported by and freely rotatable with respect to the intermediate shaft.

The intermediate shaft is preferably permanently connected to a lubrication pump for supply of lubricant to elements of the drill head. This is a great advantage, since the lubrication pump is always actuated and only depends on the motor speed (input shaft permanently rotationally coupled to the intermediate shaft).

The lubrication pump is suitably connected to lubrication channels in the output shaft and the intermediate shaft. Said lubrication channels on the one hand being axial channels extending centrally in the output and intermediate shafts, on the other hand being radial channels between said axial channels and bearings etc. to be lubricated.

Typically a gear shift unit engages the shifting sleeve. Hereby a shifting fork of the gear shift unit preferably engages in a surrounding groove in the shifting sleeve.

It is preferred that the gear shift unit is provided with an interface for alternatively a mechanically actuated shift assembly and a hydraulically actuated shift assembly. Advantageously the mechanically actuated shift assembly is arranged for direct manual maneuvering, and the hydraulically actuated shift assembly for remotely controlled maneuvering.

Basically, the shifting fork moves the shifting sleeve between high and low gear positions. The shifting sleeve has two dog clutch halves, one on the top and one on the bottom. To shift into high gear, the shifting sleeve is moved up by the shifting fork so that the dog clutch half on the top of the shifting sleeve can engage a similar dog clutch half on the input shaft. When the two dog clutch halves mesh, high gear is engaged since the shifting sleeve is permanently rotationally coupled to the output shaft.

To shift into low gear, the shifting sleeve has to move down so that the dog clutch half on the bottom of the shifting sleeve can engage a similar dog clutch half which is machined into the driven gear wheel of the second speed reduction gear couple. When these two dog clutch halves mesh, low gear is engaged since the input shaft is connected to the output shaft over the two speed reduction gear couples incorporating the intermediate shaft in the transmission.

This applies to both manual and hydraulic/remote controlled shifting.

For manual shifting, the shifting fork is connected by means of a shaft to a lever with two parking positions, for high and low gears. The lever is equipped with a locking arrangement so that the lever cannot be accidentally moved once it is put into its proper parking position.

For hydraulic shifting, a shaft connecting the manual shift lever to the shifting fork is simply replaced by a housing having a hydraulic cylinder and piston in the interface of the gear shift unit.

With both manual and hydraulic shifting, and whether shifting from high to low, or low to high, the shifting sleeve with the two dog clutch halves will not likely be able to engage the mating dog clutch halves at first try, since it is unlikely that the dog clutch teeth will align allowing proper meshing. The solution is to jog the hydraulic motor when shifting so that the dog clutch halves can engage while being pushed together by manual, spring or hydraulic force.

The drill head housing is virtually identical for both manual and hydraulic shifting. Only the elements being associated with the shifting mechanism that are connected to the shifting fork need to be changed when converting from one shifting type to the other. These parts can be removed and installed from the outside of the drill head without major disassembly such as splitting the housing into sections.

The advantages of this aspect of the invention are:
a) It makes remotely controlled hydraulic shifting possible with indication of full engagement of high and low gear. Hydraulic shifting can be done without needing access to the drill head which is often covered by a safety guard.
b) Only a few parts have to be changed to convert a drill head from manual to hydraulic shifting and this can be done without major disassembly. Thus, the decision as to what type of shifting is to be shipped can be left to final assembly.
c) Completely assembled drill heads can be changed from one type of shifting to the other type in the field without major disassembly of the drill head.
d) The use of common shifting forks and housings for both types of shifting, reduces the costs and increases the flexibility of manufacture.

The invention also relates to a drill rig including a drill head according to the above.

BRIEF DESCRIPTION OF DRAWINGS

The invention will now be explained in more detail by way of an embodiment at the background of the annexed drawings; wherein:

FIG. 2 shows in a perspective view a drill head according to the invention, FIG. 3 shows an axial section of the drill head in FIG. 2, FIGS. 4a and 4b show in isolated views the clutch being in its different positions, FIG. 5 shows an axial section illustrating a manual shifting assembly, FIGS. 6a and b show in axial sections parts of a manual shifting assembly and of a hydraulically controlled shifting assembly, and FIGS. 7 and 8 show clutch details.

DESCRIPTION OF EMBODIMENTS

Figure 1:
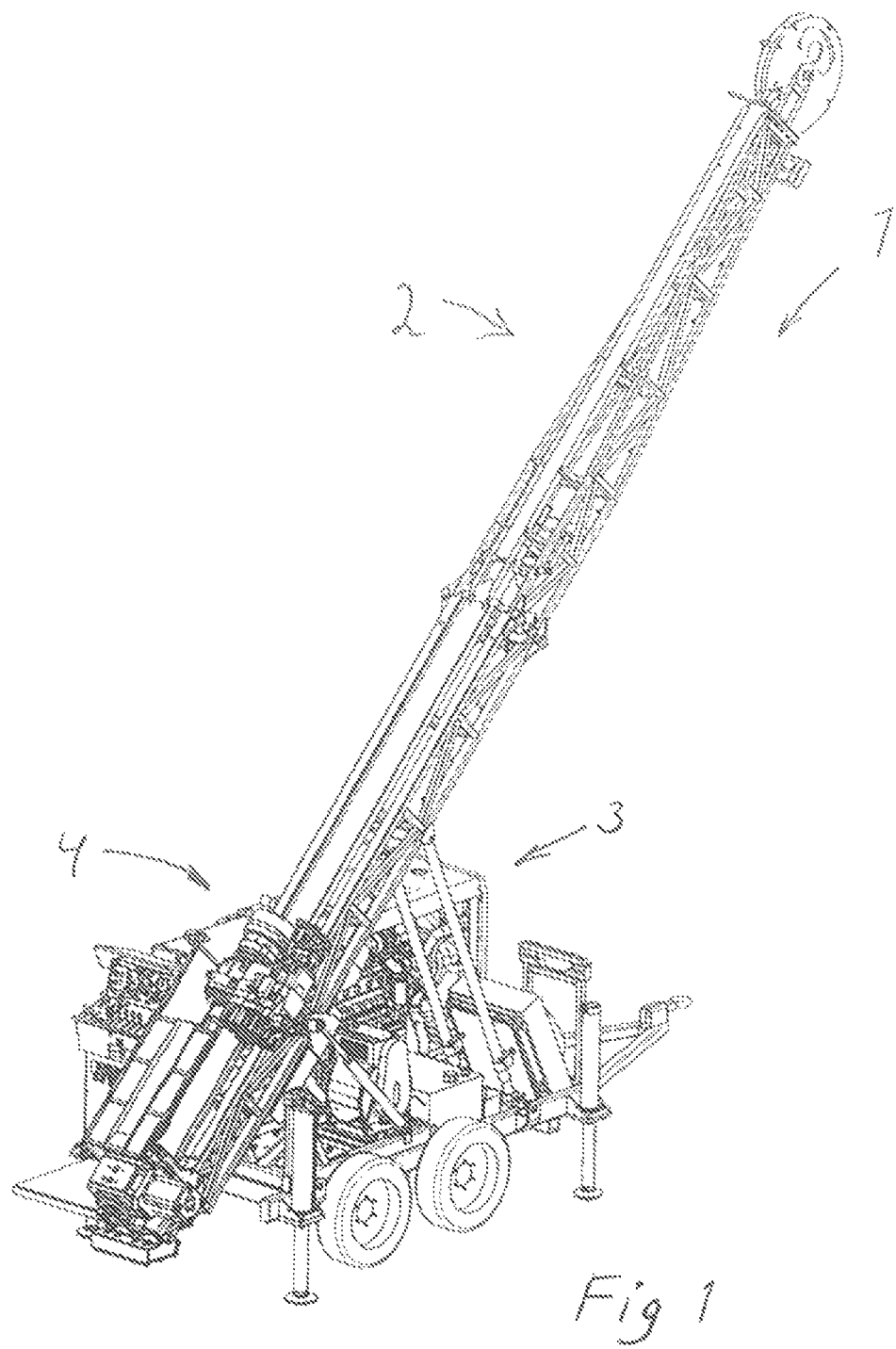
FIG. 1 illustrates in a perspective view a rotation drilling rig equipped according to the invention.

FIG. 1 shows a rotation drilling rig 1 for exploration drilling, the rig having a mast 2 with an elongate feed beam supporting a drill head 4. The drill head 4 is movable up and down along the feed beam. A power unit 3 contains usual machinery for the supply of power to the drill head 4.

At the top of a drill head spindle 7 of the drill head 4, shown in greater scale in FIG. 2, there is positioned a chuck 5 for gripping the drill string (not shown in the Figures) for transferring rotational and axial movements to the drill string. 6 indicates a split drill string top bushing having a separation 28. 27 indicates a split drill string bottom bushing having a similar separation (not shown). A rotation motor is indicated with M.

FIG. 3 shows an axial section of a drill head 4, wherein an input shaft being connectable to a rotation motor (M in FIG. 2) is part of a gear change transmission 8 for providing the drill head spindle 7 with two different rotational speeds.

The input shaft 9 has an axis 11 and is co-axial with an output shaft 10. The input shaft 9 is permanently coupled to an intermediate shaft 12 over a first speed reduction gear couple 13. This means that the intermediate shaft 12 rotates with a reduced speed as compared to the input shaft 9. The intermediate shaft 12 is further over a second speed reduction gear couple 15 connectable to the output shaft 10. The second speed reduction gear couple 15 is arranged such that, when interconnected, the output shaft 10 rotates with a reduced speed as compared to the intermediate shaft 12.

A clutch 14 is arranged such that in a first position it directly interconnects the input shaft 9 with the output shaft 10 so as to obtain the same rotational speed of the input shaft 9 and of the output shaft 10. For that purpose the clutch 14 includes a shifting sleeve 16 which in the first position is in engagement with an input clutch half on the input shaft at the same time as the shifting sleeve 16 is permanently rotationally fixed to the output shaft 10 for all axial positions of the shifting sleeve 16.

This is conveniently realized by the shifting sleeve 16 having inside teeth engaging in outside axially extending splines on the output shaft 10. 22 indicates the permanent rotational coupling between the shifting sleeve and the output shaft.

The output shaft, in turn, is coupled to the drill head spindle 7. In the first position of the clutch 14, the drill head spindle 7 therefore rotates with high speed.

The clutch 14 is also shiftable to a second position, wherein the shifting sleeve 16 couples a driven gear 21, of the second speed reduction gear couple 15, to the output shaft 10. At the same time the clutch 14 releases the connection between the input shaft 9 and the output shaft 10. Hereby rotation from the (not shown) rotation motor goes from the input shaft 9 over the first speed reduction gear couple 13 to the intermediate shaft 12 and over the second speed reduction gear couple 15 to the output shaft 10. In the second position of the clutch 14, the drill head spindle 7 therefore rotates with low speed.

The output shaft 10 is permanently coupled to the drill head spindle 7 over a gear train 24 which includes a gear on the output shaft 10, an intermediate gear wheel 25 and a gear wheel fastened to the drill head spindle 7. As can be seen from FIG. 3, the intermediate gear wheel 25 is supported by the intermediate shaft 12 but is freely rotatable with respect to the intermediate shaft 12 since it is supported over roller bearings on the intermediate shaft 12.

It should be noted that the representation is FIG. 3 is straightened with respect to the axis 11 of the input and output shafts, the axis 26 of the intermediate shaft and an axis 47 of the drill head spindle. In practice it is often convenient to have a plane through axis 11 and 26 forming an angle with a plane through 26 and 47 for the reason of compactness.

The intermediate shaft 12 is connected to a lubrication pump 48 for permanent operation thereof as soon as the intermediate shaft 12 rotates. The lubrication pump supplies lubricant to elements and parts of the drill head 4 requiring lubrication. 29 indicates a central axial channel inside the intermediate shaft 12 being branched off with a radial channel branch 30 for providing lubrication to bearings supporting the intermediate gear wheel 25 on the intermediate shaft 12. 31 indicates an axial channel inside the output shaft 10 for supplying lubricant to radial channels 32 providing lubricant to bearings supporting the output shaft and the driven gear wheel 21, of the second speed reduction gear couple, on the output shaft.

FIGS. 4a and 4b show perspective views illustrating the function of the clutch 14 in the first position (FIG. 4a) and in the second position (FIG. 4b).

In FIG. 4a, an input shaft 9 is directly coupled to the output shaft 10 in that the clutch 14, being a dog clutch, having its first sleeve teeth 17 engaged with input teeth 18 associated with the input shaft. As is described above, the shifting sleeve 16 is also permanently rotationally coupled to the output shaft 10 in all positions of the shifting sleeve. 36 indicates a surrounding groove facing radially out, which is engaged by a corresponding ridge being provided inside of a shifting fork 35 of a gear shift unit 34.

The shifting fork 35 is movable axially up and down and is thus in FIG. 4a in its first position.

In FIG. 4b the gear shift unit 34 has displaced the shifting fork 35 to its second position, wherein the shifting sleeve 16 couples and locks the driven gear 21 of the second speed reduction gear couple (15 in FIG. 3) to the output shaft 10 for obtaining a reduced speed of the drill head spindle.

In particular, an input clutch half 42 is attached to the input shaft 9, an output clutch half 44 is attached to the driven gear wheel 21 of the second speed reduction gear couple (15 in FIG. 3). 43 indicates a first sleeve clutch half for co-operation with said input clutch half 42 and a second sleeve clutch half 45 is arranged to co-operate with said output clutch half 44.

Furthermore, each tooth of all clutch halves have an angled top land (49 in FIG. 7), meaning that meeting clutch half surfaces are slightly inclined to allow initiation of engagement prior to complete interconnection. Clutch teeth being completely in engagement with each other can be seen between teeth 17 and 18 on FIG. 4a and teeth 19 and 20 on FIG. 4b.

FIG. 5 shows a manual mechanical shifting assembly 37, wherein a lever 38 having a locking sleeve 39 is shiftable between the shown, first position, wherein the shifting sleeve 16 has been brought to its upper position by the shifting fork 35. The lever 38 is connected to an axially movable spindle 40 which in turn supports the shifting fork 35. 41 indicates a return spring 41 which pushes the axially movable spindle 40 up for shifting to the first position from the second position.

In order to illustrate the simplicity in which the drill head can be converted from manual mechanical shifting to hydraulically controlled shifting, e.g. from a remote position, FIG. 6a shows the manual mechanical shifting means from FIG. 5 whereas FIG. 6b shows an alternatively constructed hydraulically controlled shifting means.

The invention makes it possible to use the manual mechanical shifting means in FIG. 6a, or the hydraulically controlled shifting means in FIG. 6b by being able to simply replace one shifting means by the other. This is done by unscrewing either threaded members 50 or 51 from the mating threaded hole in the shifting fork 35 and replacing it by the other. Suitable means are provided to unlock and lock this threaded connection so that it cannot become loose or undone during shifting operations. The springs are adjusted to the respective two shifting means 37' and 37" and are therefore included therein so as to be part of the replacement.

Position sensors are preferably arranged that sense the position of the hydraulic components and will indicate when the shifting sleeve is in the meshed position and either high or low gear is engaged. 53 and 54 in FIG. 6b indicate such position sensors adapted to sense the presence of a movable element such as a knob 55 in order to verify that the desired position has been reached. The position sensors can for example be inductive, capacitive or be Hall Effect sensors.

FIG. 7 illustrates the angled top land 49 of a tooth 17 of the shifting sleeve 16. As can be understood from FIG. 7, the angled top land 49 describes an angle α to a plane being perpendicular to the axis of the shifting sleeve 16. When interconnecting the shifting sleeve 16, during shifting, with the input clutch half 42 (see FIG. 4b), the meeting clutch teeth contact each other and then more easily reach relative positions, where full engagement can be obtained, when the motor is jogged, as is described above.

FIG. 8 shows that the sides of clutch teeth are angled x° so as to obtain safer interconnection and also for aiding in reaching a fully interconnected state as is described above.

The manual shifting briefly consists of the following:
- a lever is moved by the operator, complete with a locking device, which can be parked in both the high and low gear positions affecting a shaft that connects the lever to the shifting fork
- a spring helps lift the shifting fork. Using the lever, the operator moves the shifting fork up to shift from low to high gear, and moves the shifting fork down to shift from high to low gear. Since typically the dog clutch halves do not mesh at first try, the gear train has to be jogged before the lever can be fully put into the parked position.

When shifting from low to high, the spring assists the operator to lift the shifting sleeve. When the gear train is jogged and dog clutch halves align and mesh, high gear is engaged and the lever can then be moved, or moves itself, to the high gear parking position and be secured in place.

The hydraulic shifting mechanism consists of a hydraulic cylinder with a piston (not shown) and a spring. Applying hydraulic pressure to the cylinder will move the piston down and compress the spring. Since typically the low gear dog clutch halves will not mesh at first application of the hydraulic pressure, the gear train needs to be jogged to align and mesh the dog clutch halves. Low gear is then engaged.

Releasing the hydraulic pressure allows the spring to expand and move the shifting fork and the shifting sleeve to the high gear position. Also, since typically the high gear dog clutch halves will not mesh at first contact, the gear train needs to be jogged and the spring will move the shifting sleeve into the meshed position. High gear is then engaged.

The same drill head, with a two speed transmission, can be used on different models of drills.

The hydraulic shifting has an automatic feature to the extent that the meshing of the dog clutch halves takes place automatically after the motor is jogged since the hydraulic pressure (for low gear) and spring force (for high gear) will complete the meshing. This is in contrast to the mechanical shifting where typically the lever will still have to be moved manually into the parking position at the same time as the motor is jogged.

Typically, drill head transmissions in current use on mineral exploration drills come with manual shifting and are not available with hydraulic shifting, which can be controlled remotely so as to be more convenient for the operator.

The invention claimed is:

1. Drill head for a rotation drilling rig, including: a rotation motor, a drill head spindle, and a gear change transmission between the rotation motor and the drill head spindle, the gear change transmission including an input shaft connected to the rotation motor and an output shaft connected to the drill head spindle, wherein the input shaft is co-axial with the output shaft, the input shaft is permanently coupled to an intermediate shaft over a first speed reduction gear couple the gear change transmission includes a clutch being shiftable between
   i. a first position interconnecting the input and output shafts for obtaining the same rotational speed for the input and output shafts, and
   ii. a second position connecting the intermediate shaft to the output shaft over a second speed reduction gear couple.

2. Drill head according to claim 1, wherein the clutch is a twin dog clutch including an axially movable shifting sleeve having:
   first sleeve teeth for co-operation with input teeth associated with the input shaft in the first position, and
   second sleeve teeth for co-operation with output teeth on a driven gear wheel of the second speed reduction gear couple in the second position, said driven gear wheel being co-axial with the output shaft.

3. Drill head according to claim 2, wherein the shifting sleeve is permanently rotationally coupled to the output shaft.

4. Drill head according to claim 2 wherein the first and the second sleeve teeth and the input and output teeth have angled top lands allowing contact prior to completed interconnection in the respective first and second positions of the twin dog clutch.

5. Drill head according to claim 1, wherein the output shaft is permanently rotationally coupled to the drill head spindle.

6. Drill head according to claim 5, wherein the output shaft is coupled to the drill head spindle over a gear train having an intermediate gear wheel being supported by and freely rotatable with respect to the intermediate shaft.

7. Drill head according to claim 1, wherein the intermediate shaft is permanently connected to a lubrication pump for supply of lubricant to elements of the drill head.

8. Drill head according to claim 7, wherein the lubrication pump is connected to lubrication channels in the output shaft and the intermediate shaft.

9. Drill head according to claim 2, wherein a gear shift unit engages the shifting sleeve.

10. Drill head according to claim 9, wherein a shifting fork of the gear shift unit engages in a surrounding groove in the shifting sleeve.

11. Drill head according to claim 9, wherein the gear shift unit is provided with an interface for alternatively a mechanically actuated shift assembly and a hydraulically actuated shift assembly.

12. Drill head according to claim 9, wherein the mechanically actuated shift assembly is arranged for direct manual maneuvering, and the hydraulically actuated shift assembly is arranged for remotely controlled maneuvering.

13. Drill head according to claim 1, wherein the rotation motor is a speed adjustable hydraulic motor.

* * * * *